United States Patent [19]
Porter

[11] 3,736,068
[45] May 29, 1973

[54] RECYCLE POWER UNIT

[76] Inventor: Cecil Lloyd Porter, Route 1, Box 242, Courtland, Ala. 35618

[22] Filed: Nov. 3, 1970

[21] Appl. No.: 86,436

[52] U.S. Cl. ................................................415/89
[51] Int. Cl. ..............................................F04d 1/14
[58] Field of Search ....................................415/89

[56] References Cited
UNITED STATES PATENTS
462,987  11/1891  Nicholas et al. ..........................415/89

FOREIGN PATENTS OR APPLICATIONS
72,081  6/1866  France ..................................415/89

*Primary Examiner*—C. J. Husar

[57] ABSTRACT

This Recycle Power Unit is for the purpose of creating a massive power to operate electric generators or other massive power requirements.

This Recycle Power Unit is a unit that takes water and by recycling it on a massive scale uses it to create power by the Unbalanced Force of the Siphons and the Centrifugal Force acting on the Turbines and the ejection nozzles.

The centrifugal forces are built up by a starter motor till they exceed the resistance of friction and air resistance till these forces become greater than the resistance forces. After exceeding these resistance forces they are at this point an unbalanced force which is constantly resupplied with water for recycle use to keep them unbalanced by the siphons as described in the following drawings and descriptions of Recycle Power Unit you already have.

1 Claim, 5 Drawing Figures

RECYCLE POWER UNIT

Energy is an absolute need to maintain a highly developed nation. This Recycle Power Unit will not be a contributor to pollution of our air or water so this factor will be of great help in the preservation of a better and cleaner land in which we can live.

It will make electric energy available to all parts of the world that are now unable to build the expensive chemical or dam power facilities now in use.

I claim all rights to the invention of this Recycle Power Unit. I claim also the rights to larger units built to use the principles of reaction in the manner and by the same means as used in this model for more powerful units can be built by using a greater mass of water, or other fluid in zones where water would freeze, antifreeze liquid can be used.

I also claim the right to all power generated by any other fluid source that uses the turbine and principles it contains and retain a royalty right to all methods and principles as set forth in the drawings and detailed explanation of same, in this form or other forms that embodies the same principles of using two reaction forces in this manner so as to create a power source by fluid and mechanical reactions in this Power Recycle Unit or for the use in larger or smaller units of for the use of the turbine in use by dams where this turbine or larger ones can be used or several units thereof.

The three drawings are of an explanatory nature.

FIG. 1 is the tub No. 5 and how it will need to be located in a building and the manner in which this building must be made. It is on a scale of 1/16 inch equals one foot. It gives only an explanatory view for the distances are so great that fine detail is not possible. Fine detail is in fact not needed for even as it may appear to be complex at first a careful study of it will show it is indeed a very simple and very easily understood facts and reactions caused by the law of physics.

To get total reaction the power of this one stack unit must be multiplied by forty as the tub No. 5 contains 40 of these units, each set at an angle of 9° from center of moments of tub No. 5.

Figure 3:
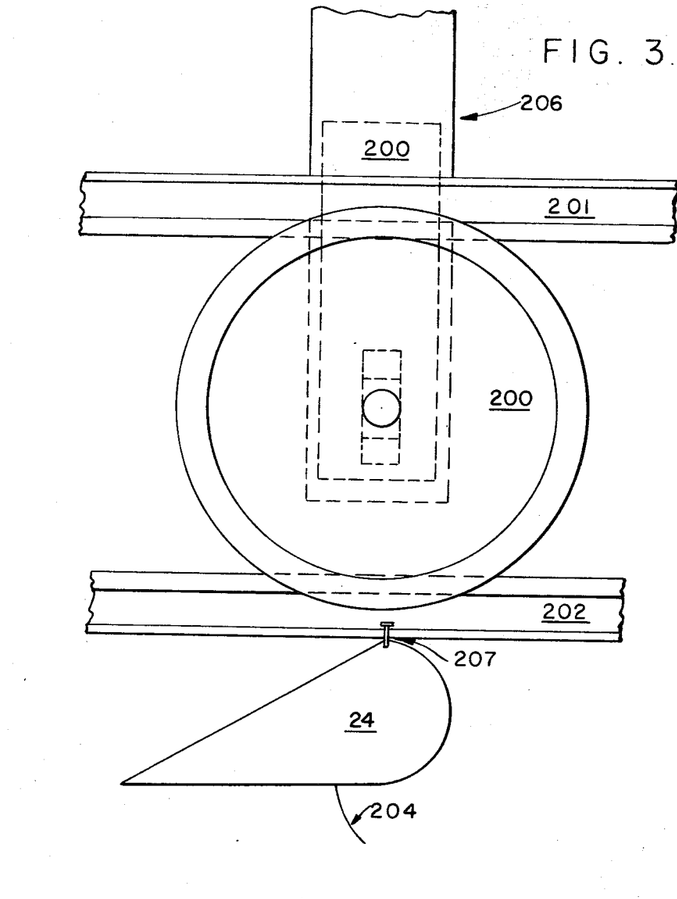
FIG. 3 is of the explanatory type to show manner of making parts inside turbine. This drawing is on a scale of 1 inch equals 5 inches.

This type turbine is a turbine that completely rotates. This causes two powerful forces to act on fluid within it. Rotating causes the fluid to press against outer wall of turbine. Centrifugal force causes a powerful pull on fluid so as the fluid pressure is greater at the outer wall the pull will cause a greater force on the blades in the turbine by causing a greater force on them as the fluid is pulled along the outer edge of each blade it gives a greater torgue force to the turbine. In use in a dam the same forces of rotating centrifugal force will act but in the falling water you have the gravity weight of water pushing on blades instead of centrifugal force pulling on them. I claim invention rights on this turbine in use by using gravity water, or centrifugal fluid forces on it as herein described.

I have made no drawing of the use of the turbine in a dam for the volume of water and height thereof would determine its size. The principle of the blades and their form to give the greatest torque force is in my belief the only turbine of this kind.

Figure 1:
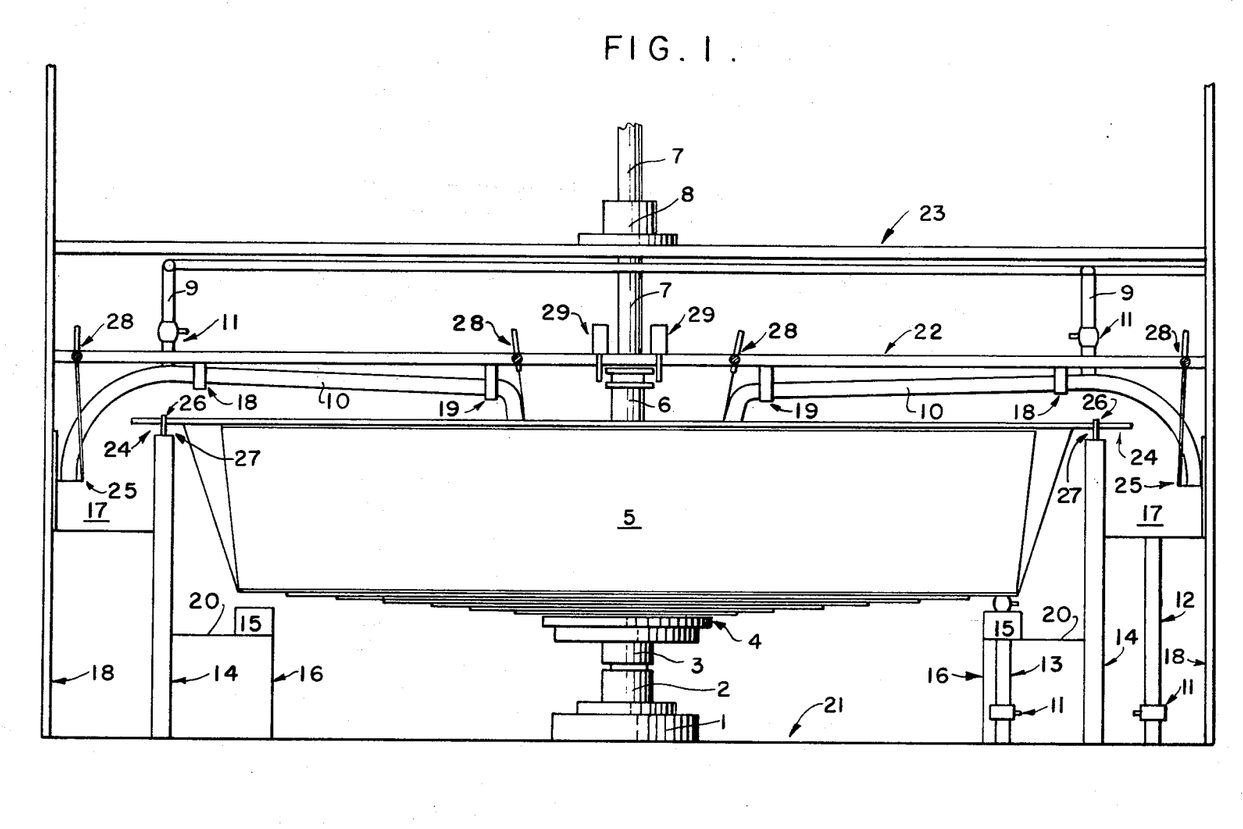

The reaction of force from the stationary nozzle at end of turbine on tub No. 5 will cause a torque force on tub No. 5 that will be of great power because it is so far from the center of moments of tub No. 5.

The rolling weight of the turbine and the torque force it creates on the circular steel rail will also put a great force on tub No. 5.

The siphon force on vanes No. 88 will give a lesser force but all three forces must cause torque force on tub No. 5 in counter clockwise direction.

In this invention, I believe I am the only inventor of this type of power unit. To the best of my knowledge, I have never heard of or seen anything like it before I invented it and I claim it as my invention.

This Recycle Power Unit is based on the laws of physics.

For every action there is an equal and opposite reaction. This equal and opposite reaction can become a constant reaction if it is based on an unbalanced force that can be kept in an unbalanced state.

A siphon is an unbalanced reaction or force. To set a siphon in such a manner so it will be constantly supplied with a liquit it will constantly cause a constant reaction of force.

In this invention, the siphons pour out their water from the stationary circular recycle water tank No. 17 onto the sloping side wall of the center water tank in tub No. 5 so that the water will cause a constant counterclockwise force on the vanes that are at a distance of over 16 feet from the center of the water tank in the center of tub No. 5. The vanes are on the sloping side wall of the center water tank that angles up to the wide outer side wall of this tank No. 35, on the braces that hold this sloping side of the center water tank on the inside end of these braces No. 85 up to wall No. 35. The water will constantly cause a torque force on these vanes No. 88 as it flows down them on the angle side of the center water tank, provided water is kept in the outside circular water tank at a height greater than the water height in the center water tank of tub No. 5.

The tub No. 5 must be rotated by an outside force so as to start the reaction cycle. At required speed outside force is removed.

Figure 2:
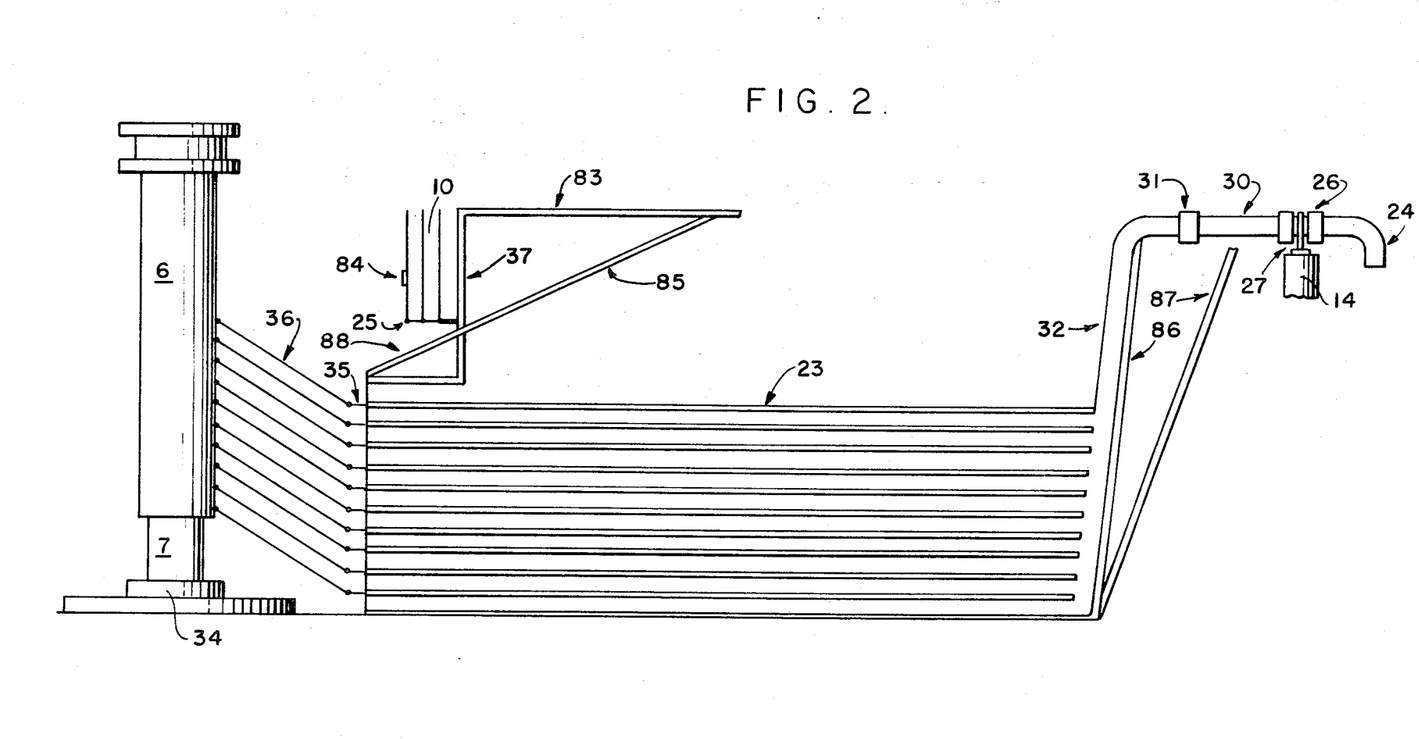
FIG. 2 is of only one set of stack pipes and one turbine and how they operate. This drawing is on a scale of ⅛ inch equals 1 foot.

The stack of pipes in the stack drawing No. 33 are connected to a pipe leading up to a turbine by pipe No. 32.

No. 30 is the turbine
No. 31 are turbine bearings
No. 26 is wheel keyed to rotating turbine
No. 27 is circular steel track for wheel No. 26.
No. 24 is snozzle of turbine that is bolted to outer edge of tub No. 5 in slot of edge so as to cause the least air resisyance. The turbine is also in this slot for the same purpose and to create power on wheel No.26 so it will cause a constant and opposite reaction to centrifugal force of water as it passes through it so as to keep the tub turning at a constant speed provided all excess power is used so tub will not increase in speed.

The law of physics is that a mass will remain in motion as long as a force acts on it that is greater than the friction of said mass.

The centrifugal force of water in the stack pipes No. 33 will flow up and out through the turbine. The torque force put on wheel No. 26 is at a distance of 75 feet from the center of moments of tub No. 5 so the power to cause this tub to rotate is tremendous.

As water is ejected by the slanted down at 30° angle nozzle at end of turbine, here you get another powerful reaction once more against tub No. 5 in counter clockwise direction at over 75'.

Hereby you now have 3 forces acting on tub No. 5 in a counter clockwise direction. The vanes No. 88 on sloping side of center water tank. The blades inside turbine driving turbine and wheel No. 26. The reaction of the nozzle as water is ejected by the powerful centrifugal force action on water drawn from center tub No. 5 water tank.

Once water in tub No. 5 is drawn by centrifugal force that is greater than the gravity weight force of water you have created an unbalanced force that is greater than gravity so this becomes a second unbalanced force of the siphons. These two unbalanced forces will continue to operate as long as water level in outside water tank is higher than water level of center water tank in tub No. 5. The centrifugal force will remain constant as long as water is fed to it by the siphons. The siphons will operate constantly as long as they are fed by the same volume of water being supplied to them by the centrifugal force causing water to be cast out through turbines and nozzles.

Having the constant unbalanced force of the siphons acting on tub No. 5 will create a constant rotating force on tub No. 5 so it will constantly rotate according to speed and force of centrifugal force acting on water as it is cast out of nozzles. These nozzles are at such a great distance that they will cause a great torque force.

You can not compress water to a very small degree so as centrifugal force on the water quadruples every time speed is doubled, you must be very careful as this force will become uncontrollable if not watched closely.

Additional water must be added from time to time to replace water lost by evaporation.

This is in fact a very simple power unit as it uses two unbalanced forces to compliment each other in a manner so each constantly supplies the needs of the other in such a manner as to make available for power use, some of the unbalanced forces.

The turbine is to the best of my knowledge based on a new principle, as it can be also used in dams. I hereby claim the invention of it in other forms of power units where it can be used.

This turbine as it rotates causes the water to press with great force against the outside wall of the turbine. This causes the water pressure to be greater at this point. As the water is pulled through the turbine by centrifugal force as in this invention, or by gravity weight force when used in a dam. The water will have to press against the longer outside edge of the turbine blades No. 40 thereby causing a greater torque force by this method. As this force is greater at the outer edge of the turbine this gives a greater force to the turbine as it turns. The turbine blades are set in such a manner that as water is pulled through the turbine rings each set will give a greater torque force to the turbine as water passes through it. I claim to be the inventor of the Recycle Power Unit as described and of all units using anyone or more parts of it in larger or smaller sizes or reactions thereof.

Lid on siphons on end inside tub No. 5 are hinged so as to divert water at right angle to but wall No. 37 so water will strike vanes on brace No.85 on angle wall between large and small sides of tub No. 5 water tank. As brace No. 85 is welded to wide side of center water tank the short brace and blade sticking up from the continuation of this brace from the top edge of the bottom smaller part of the center tank must have a vane or blade sticking up so water from siphons striking these blades will cause a counter clockwise force on tub.No. 88 is vane on brace No. 85 on slanting wall of tank.

In sum total the reaction of the 2 foot dia wheel on turbine plus the reaction of water leaving the pipe nozzle at end of turbine plus the reaction of siphon water on vanes No. 88 we have a total of three forces acting on the Recycle Power Unit, all giving it a torque force in a counter-clockwise direction. The three forces will far exceed friction and air resistance.

This Recycle Power Unit is based on the laws of Physics.

When tub is rotated till the centrifugal force acting on the water in the tank in center of tub No. 5 and inside stack pipes and angle pipe No. 32 that takes flow of water from them to turbine, becomes great enough to overcome the gravity weight of the ten cubic feet of water in pipe No. 32 that extends up and above water level in center tank of tub No. 5 to cause water to flow through turbine. The resistance of the 10 feet becomes less as the water coming out of nozzlw of pipe at end of turbine will act as a siphon on 2 feet of the resistance caused by the 10 feet. Also the centrifugal force pulling the water through the turbine and nozzle will also reduce the resistance by causing a pulling force on water coming from pipe No. 32. So in actual operation the resistence force against which each stack must overcome in operating will be less than the gravity weight of 10 cubic feet of water. At 62.4 lbs. per cubic foot this is even at 10 ft. only 624 lbs. The mass of over 500 cubic feet of mass in each stack for each turbine can easily overcome this, and then air resistance and friction of bearings and wheels must be overcome.

Based on the law of physics the centrifugal force acting on water will quadruple every time speed is doubled. Therefore when centrifugal force on the water becomes greater than the gravity weight of water, you have a force greater than falling water that will be acting on turbine blades and be causing a reaction as it leaves the nozzlw of pipe at end of turbine, that extends downward and backwards toward the viewer on right hand side of tub No. 5 so as to cause a counter clockwise force on tub No. 5. The lids on the stack pipes will help divert water in tub No. 5 center tank so as to cause water to flow into stack pipes.

One siphon must have lid closed on end inside center tank. The other end is opened so water flows from the outside water line into outside stationary circular tank till it is filled to where it's water level will be at least 3 feet higher than the water level in the center tank will be when it isfilled. A guage to keep the water level in the tanks at these levels must be used so operator will know that the tanks are filled to their proper levels. Large painted numbers on tank walls for gauges will do for this purpose.

After outside recycle water tank is filled to proper level the conventional power unit must start rotating the tub before it is filled. While tub is being brought up to desired speed the siphons are all closed and filled with water. After the tub attains speed, one end of one siphon is opened into tub to fill it to proper level. Then as water flows out into outer recycle tank pairs of siphons are opened to return water at same volume as that discharged by turbine nozzles. The greater the speed the greater the volume as it will be traveling at greater speed. Care must be taken to see that speed does not become too great for the forces in this power unit multiply at such a staggering rate it will soon be out of control and sleeve must be lowered to stop centrifugal force of unit.

The cubic feet of water returned to the center tank per minute by siphons must be multiplied by 62.4 lbs. per cubic ft. and this × 2 fft. will comply with the law of physics that work = force $x$ distance. Force being weight of water, distance water falls into tub No. 5 recycle unit. A siphon is an unbalanced force, so the recycle unit is powered by this unbalanced force. It is kept in operation by centrifugal force that is sustained by the unbalanced force of siphons yhat are applied to vanes No. 88.

Each mass that is set in motion will remain in motion as long as a force is exerted on it that is greater than the friction and air resistance that tend to stop its motion.

Each turbine will weigh about one ton. I have not drawn a thickness drawing of turbine as it will be governed by the thickness and strength of steel needed to sustain the forces acting within it by the engineer that decides the exactm measurements thereof, to also act as axle of wheel No.26.

Each turbine once set in motion will act as a flywheel of one ton. This will give a total of 40 tons of flywheel reaction by the turbines.

Tub No. 5 once set in motion will also act as a flywheel so this force plus the force of 40 tons of turbines once set in motion will create a massive reaction that can be kept in motion by the gurdruple law of increased force caused by centrifugal force plus the unbalanced force of the siphon law of force.

Larger and far more powerful units can be built by using longer stack pipes. This drawing shows what I believe to be the smallest unit that can be useful.

Detailed description of parts by their numbers. First drawing is on scale of 1/16 inch equals 1 foot.

No. 1. Concrete reinforced base set on foundation sunk in floor No. 21.

No. 2. Housing for base bearing of thrust type of base of drive shaft No.7.

No. 3. Collar on shaft No. 7 with wide shoulder to support weight of tub No. 5

No. 4. Large gear that is used to set tub rotating by use of a conven-type motor, gas, deisel, electric or steam that is geared to it by the ration required by the type of force unit used.

No. 5. The tub that sits on top of eight layers of circular layers of steel to brace and sustain part of the weight of tub and to which the power take off shaft that goes up into second floor through bearing and housing No. 8 to be geared to generator for making electricity or to directly power a giant lift pump for irrigation or any other use where a massive amount of power is required. Shaft No. 7 is keyed to base and base collars so when the tub turns the shaft No. 7 turns. The tub also has 40 wheels No. 26 that run on a circular steel rail No. 27 that is on top of a circular concrete and steel wall No. 14. Doors must be placed in this circular wall for entrance to space under tub No. 5. These wheels are keyed to a 10 foot turbine that is held in place by bearing housings and bearings not shown in drawing because this drawing is on a scale of 1/16 of an inch for each foot so the lines would be too small to show clearly the manner of their setting and the steel braces needed to make them strong enough to sustain the balance of the weight of the tub No. 5. The nozzlw No. 24 coming out of the end of each turbine must be set so it points down and back toward thw viewer at an angle of 30° on the right side of the picture, this is so the reaction of the water as it leaves the nozzle under centrifugal pressure will cause a counter clockwise force on tub No. 5.

No. 6 is a sleeve that fits around shaft No. 7. This sleeve when raised into position,as shown in this drawing, by air jack arms that extend down through walk way floor No. 22 that have massive bearings running on axles that extend into bearing runway at top of sleeve, will while in this position hold open the lids on the stack pipes in tub No. 5. Because of size,these stack pipes are shown in another drawing on different scale to more clearly show how No. 6 sleeve, when lowered will close the lids to the stack pipes. Only one set of stack pipes and angle pipe leading to turbine No. 30(not shown on this drawing) out of a total of 40 stack pipe sets and 40 turbines is shown in another drawing. Bearings on arms turn in sleeve No. 6 as stationary No. 29. Air jack lifts sleeve or lowers sleeve to open or close stack pipe lids in center water tank surrounding sleeve and shaft No. 7 in center of tub No. 5. Sleeve must turn with shaft No 7 at same speed as tub No. 5 turns.

No. 8. Bearing housing anchored to floor of second floor to building housing tub No. 5. Bearing housing and bearing in housing No. 8 must be in true vertical line with bearing housing and bearing No.2.

No. 22.Walkway deck must have air lines circling it at all places so as to have plug in places handy to use air wrenches to operate all water valves of water pipes leading to siphons that return water from stationary circular water tank No. 17 that is between circular wall No. 14 and outside circular wall No. 18. This walkway must be firmly braced so as to sustain weight of sleeve No. 6 as well as weight of 40 two foot dia siphon pipes. These siphon pipes must return an equal volume of water to the amount ejected by the turbines. Water level in center tub tank must be constantly kept lower than water level in outside stationary tank so this siphon will work. Control of all siphons No. 10 must be carefully kept under observation by operator.

No. 9. Is a series of short water pipes coming down from a circular pipe over head water pipe fed from outside of building. This overhead circular water pipe is to be above the highest point of each siphon so when the lids are closed on each siphon and the valve No. 11 is opened water will fill each siphon in this manner. Also a small air valve to be operated by hand directly under valve No. 11 must be opened so water will flow into siphon and not cause an air pocket. After each siphon is filled both valves must be closed so when siphon lids No. 25 are opened by air wrench on end of screw jack No. 28, the siphons will begin to take water from the stationary circular tank No. 17 and return it to tank in center of tub No.5.

No. 20. Circular walkway around inside of wall No. 14. Steps up to this walkway can be placed where they are most convenient to doorways in wall No. 14.

No. 15. Is a small circular open drain trough for drain plug from tub No.5, to empty into in case repair work must be done a small pipe (not shown in drawing) runs from center water tank of tub No. 5 to valve shown on lower right hand side of tub No. 5. Valve is set so it can be easily operated by a air wrench as air lines must also be on this lower walkway for operation of this valve if needed. Air lines must also be near drain pipes No. 13 and No. 12 valves that are down on the first floor No. 21. Air lines are not shown No. 13. Drain pipe for emergency draining of circular drain trough No. 15.

No. 12. Drain pipe for emergency draining of stationary circular water tank No. 17 between wall No. 14 and wall No. 18.

No. 23. Second floor of building to house generators or other power operated units. This drawing of tub No. 5 is 1/16 inch represents 1 ft.

No. 22 Is walkway over siphons and will carry the weight of siphons and sleeve No. 6. It must be braced to hold a heavy load. At least eight heavy steel cables should be used, or more, to sustain weight on this wide circular span covering most of tub yet leaving ample room to observe tub No. 5 below and operations thereof.

No. 28. Screw type jacks that have flexible steel cables that extend down from where they are located above each inside siphon end so as to open or close siphon lids. They must have fitting at top of each one so an air wrench can operate them. Outside siphon lids controlled by steel hinged rods.

No. 16 Is the number of posts used to support drain tank No. 15 and walkway No. 20 on ground floor.

No. 11 Drain valves with heads so air wrenches can operate them.

No. 19 Hangers to holp siphons to walkway No. 22.

No. 18 Hangers to hold siphons to walkway No. 22.

Figure 4:
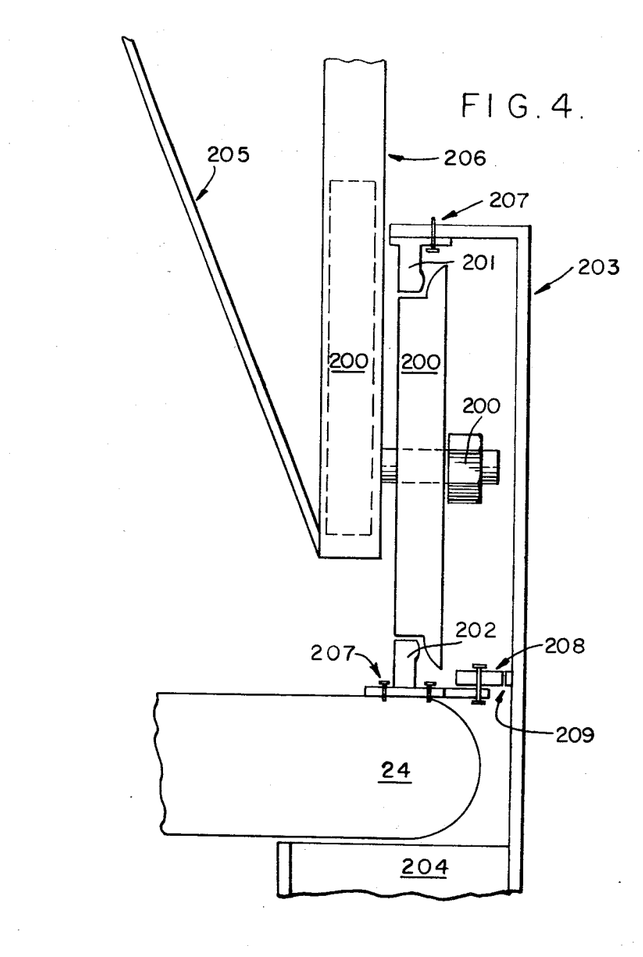
FIG. 4 is a plan view of the circular track that runs on top of the turbine nozzles.
Figure 5:
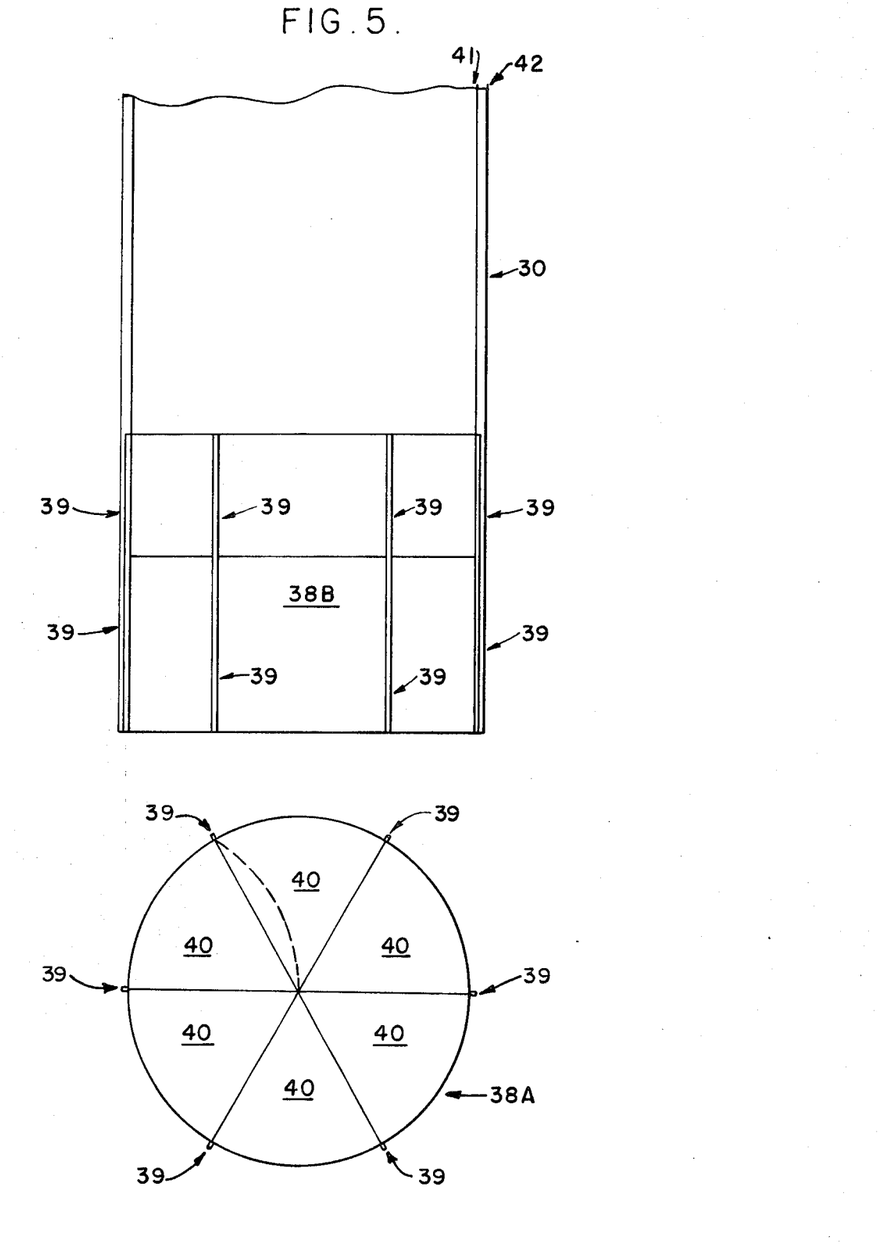
FIG. 5 is an end view of the circular track shown in FIG. 4.

No. 27. Circular steel rail on top of wall No. 14.

No. 26 Wheel on turbine No. 30

No. 24 Nozzle to divert water from turbine down into recycle stationary tank No. 17. Nozzle to extend down and backwards at 30° degree angle to viewer on right hand side of drawing so escaping water from nozzle will cause counter clockwise force on tub No. 5.

No. 23 Floor of second story of building that holds bearing housing No. 8 with shaft No. 7 coming up through it to power units on this floor.

No. 20 Circular walkway around wall No. 14 on inside next to drain tank on inside No. 15.

No. 13 and No. 12 drain pipes.

No. 18 Outer circular wall that extends up above second story. Stairways and doors must be built in and outside of it to obtain entrance to first floor and walkway over tub and to second story floor. An elevator can also be installed on outside of wall for a faster means means of excess to walkway deck No. 22 and second story floor No. 23.

No. 25 Lid to siphon that is controlled by screw jack No. 28. Lid on outer edge is hinged so lid will fall down away from wall No. 18. This is because hinge is on inside edge of siphon and the lever arm must be pulled up to open siphon lid. Steel Rod going down to lever arm will close lid when jack is operated by air wrench. Inside lid on siphon that is inside tub No. 5 has an eye on side of siphon that flexible cable from No. 28 goes through so lid is lowered at right angle to wall of water resevoir tank in tub No. 5 so water as it flows off of lid will cause a force against vanes on brace inside tub. This lid should not be lowered below a 60° angle and a 45° angle is preferred if amount of water carried by siphons is equal to volume of water cast out by centrifugal force. Force on vanes must cause a counter clockwise force on tub No. 5 on slanting inside wall of water tank in tub No. 5. Sleeve No. 6 must have at least two spline fittings and shaft No. 7 must have matching spline fittings so sleeve will turn with shaft No. 7 at same speed, yet be able to have sleeve No. 6 raised or lowered by the bearings that fit into runway for them in top of sleeve. These bearings on arms from air jack No. 29 can constantly turn yet can cause the sleeve to be raised or lowered while turning without putting any strain on the rods to stack lids of a rotary nature. The splines inside sleeve will take care of the rotary force caused by bearings running in slot at top of sleeve that are controlled by the air jack No. 29. Air jack arms must have safety key slots in them so arms can be set at open and air pressure released during operation of tub. Key slot pins can be easily removed when jack is activated by air pressure. Stud bolts inside outside end of siphons hold siphon firmly to outside wall of recycle stationary outside water tank. These bolts are not shown as they would be inside siphon pipe No. 10 at end touching wall No. 18 that holds side of water tank No. 17. This view of tub is a side view without trying to draw in all 40 turbines on tub. Only one set of siphons is shown and cut view of walls and outside circular water tank 17 and drain tank No. 15 and walkways 22 and 20.

No. 9 is outside water supply pipe that makes circle under floor No. 23 and coming down through floor of walkway No. 22 to connect to siphon No. 10 at highest point of siphon so they can be filled by opening valves No. 11 and small hand operated air valve (not shown as it is to small to show on this scale) to let air out of siphon while filling, then both valves must be closed when full. Air pipes to power air wrenches are not shown eigher as they would be smaller than a heavy line at a scale that is 1/16 inch equals 1 ft. and they might confuse the lines of other parts. No lighting wiring is shown either as these conduit lines must also be set where most needed by operators. Air conduits and wire conduits are not claimed as part of patent as these type inventions are already in use. The air wrenches are not claimed either as they are also already patented products and are named to show their use in operation only.

No. 34 is collar welded or riveted to floor of tub No. 5. This is in the center of the tub and is keyed to power take off shaft No. 7. It is also in the center of the center water tank of tub No. 5.

No. 6 is the sleeve that fits over the power shaft No. 7. This sleeve is massive for it has 40 rows of hinged rods that have hinge connections to the lids of the forty rows or spokes of stack pipes No. 33 that empty into upright pipes No. 32 that leads to turbines No. 30, then through wheel No. 26 then out through nozzle no. 24. When the sleeve No. 6 is raised up as in this drawing the lids on all forty stack pipe sets are opened as shown as No. 35 which is No. of stack pipe lids is raised up till it is in a horizontal position. As tub No. 5 is turned by starting motor the water in center tank creates a centrifugal force outward on the water in stack pipes No.

33. When the centrifugal force exceeds the gravity weight in the upright pipe it will cause water to flow through the turbines and turbine nozzle. While traveling through the turbine No. 30 and nozzle No. 27 the centrifugal force once more acts on the water and will help pull the water up from the angle stack pipe No. 32.

Turbine No. 30 when full of water will weigh about 1 ton. This rolling ton on wheel No. 26 will act as a flywheel. Once set in motion the law of physics is a mass once set in motion tends to remain in motion until it strikes a force equal or greater than itself. This law also applies to the entire tub No. 5. Once set in motion its tremendous mass will also act as a flywheel by creating a huge force of momentum.

This is a slow motion unit where mass is used by the law of physics so that the outward centrifugal force of water at 1 r.p.m. becomes four times as powerful at 2 r. p. ms. Then again this outward force of water under centrifugal force is still four times greater than 4 r.p.ms. This tremendous mass is thereby increased in the power it applies to the blades in the turbine No. 30, and nozzle at this same rate every time the speed is doubled. There is 500 ft. of pipe 14 inches in dia. in one set of stack pipes. This mass must be multiplied by 40 as there are 40 sets of stack pipes in the tub No.5. Then the force exerted by water in center tank must be added then the pull of water in turbine must be added to the overall force of the mass of water involved. The great distance of the turbine No. 30 that completely turns by pressure of water on its blades will create a torque force at a distance of 75 feet from center of moments of tub power shaft No. 7. A ton rolling on a steel track under pressure at a distance of 75 feet from center must be multiplied by 40 to give total torque applied to power take off shaft No. 7 that is 4 feet in diameter. Thereby you have a turbine mass of 40 tons in motion on steel track. The only power available is the power created by the quadrepling effect of force on mass till it becomes greater that friction involved. Once the centrifugal force multiplies beyond the resistance of friction then and only then can any power become available for use. At this point the law of physics will set in and the speed of the tub No. 5 will constantly increase so a close watch will have to be kept on the tub No. 5 by the operator to see that power units are available to absorb the usable power so as to keep tub No. 5 rotating at a steady even speed that is constantly the same. This can be done by restricting flow of water into stack pipe by lowering sleeve No. 6. Then slowing flow of water in 2 ft dia. siphon pipes so volume of siphon pipes and volume of water of turbine nozzle remain equal, for these volumes must be equal at all times. Water level in stationary circular tank must be constantly kept higher than water level in center revolving tub No. 5 tank so siphons will operate. Water must be added from time to time to compensate for evaporation losses.

Lower side of No. 85 brace between outer tub wall and small inside tub No. 5 wall is solid angle wall of tub No. 5 inside water tank.

No. 85 Brace for water tank wall to solid steel top of tub No. 5.

No. 87 and 86 Braces that go up to and brace lip of tub that holds turbine No. 30 and turbine nozzle No. 24, and housings for bearings on turbine No. 30 and also hold nozzlw No. 24 in place on end of turbine as nozzle No. 24 is rigid to tub No. 5. Only turbine and wheel No. 26 keyed to turbine No. 30 revolve. No turbine brace drawing is made for so many lines needed to show same would be too fine to reproduce well and everything is of known and easily understood engineering knowledge that will be required to brace turbine and wheel so that they can carry load required of them on steel track No. 27 that is on top of circular wall No. 14.

This drawing stacks is ⅛ inch represents 1 ft. Screw type jack anchored to walk floor will have flexible cable come down through floor to operate inside siphon lids. Top of jack will have head like bolt head so air wrench can operate them. Short black line pointed to by No. 87 represents a steel ring that makes a complete circle inside tub No. 5 and each siphon is fastened by four stud bolts to this ring so they will all be stabilized on ends inside tub No. 5. This ring must have several braces to hold it in place coming down to it from walkway. I have shown no drawings of these braces as they should be located at points on walkway that are firmly braced. Four stud bolts must be put in other end of siphon so it is held securely to the outer wall of outside recycle stationary water tank. These bolts plus the hangers shown in drawing should hold siphons in place firmly. If more bracing is needed it can be applied where needed.

Brace No. 87 is outside wall brace of tub No. 5. Curved steel sheets should be set on outside of this brace to next stack brace No. 87 so as to have a smooth outer wall in this manner completely around tub so as to have as little air friction as possible The braces (not shown) that fit on top of brace 87 and go back to top deck of tub No. 5 which is shown by No. 83 as top deck of tub No. 5 are to hold turbine bearing houseings and turbine nozzlw in place. These braces are to along each side of each turbine so only a small part of turbine will be visible above tub No. 5 deck. The slots between braces that hold turbines are to be set in this manner so as to offer the least air resistance. Top deck No. 83 is to be smooth so as to also give less air resistance to Recycle Power Unit. Brace No. 86 is brace to help support pipe No. 32 and also help support deck and braces holding turbine and nozzle braces.

Every 9° around tub No. 5 is a set of stacks and turbine. Sleeve has set of hinges every 9° to match each set of stack lids. Only one set is shown so as to clearly show how they operate.

Conventional power unit to be set under tub No. 5 and geared to gear No. 4 on tub No. 5 is not shown as I claim no invention right to it. I am inventor of Recycle Power Unit.

No. 38A shows turbine ring that holds six blades. This view is looking into the end of turbine. 38 a shows the edge of ring. Ring is 7 inches wide as shown in view 38B. Ring is 14 inches in diameter inside of ½ inch thick ring. Ring has six splines of ¼ inch by one inch in width that match spline grooves in side turbine. Inside of turbine is No. 41 showing it to be one of six grooves for rings to slide into turbine on. These grooves give the force applied to each set of blades the power to ransmit this force to turbine No. 30. 16 rings fit inside of turbine, two inch thicker screw ring that is screwed in inside end of turbine on threads. 6 inch ring is in turbines other end so that these rings will act as keys to keep rings snug inside turbine.

No. 40 Represents the blades inside the ring. The partial view of the ring above the 38B view is only to show that the splines of each ring must be the same.

No. 40 is the number of each turbine ring blade. No. 39 is number of each spline on ring.

The straight lines in the end view of the turbine ring shows the seven inch wide base edge of each blade. The dotted line down to center shows how the inside of the edge of the blade No. 40 that is down and to the left of dotted line looks. The upper end of the dotted line shows that the blade is tilted up to the point opposite to the outer edge of next base blade No. 40 in clockwise direction. The blade is set at point that is 60° above the straight base line of the blade. The curve of the other side of the blade will be the same as the dotted line curve. The blades are prefectly flat and ½ inch thick. The blade edge is curved to meet the outer wall of turbine as it goes up to the 60° point at back side of ring then the other edge starts from zero in a curved dotted line of same angle back to center where dotted line ends. I use the dotted line show that this edge is covered by the base 7 inch edge of the next blade. All blades are of same size and angle. Each blade is ½ inch thick. Edge at broad base must be ground to a curve equal to a ¼ curve of one inch circle with curve starting at bottom of blade and curving up to top side of blade.

All blades must be firmly welded to ring along outer edge. Tips of broad edges in center must be ground to triangle shape so all edges will brace each other in center of ring then welded to give a positive brace to each blade. Blades must be of polished steel made to resist wear. Curved dotted line edge to be round as side of ½ inch circle. Side of contact. Side of contact to ring is to be ground so as to fit snugly against wall of ring so clean job of welding can be done on it. Smooth inside parts are essential to all surfaces that have water flowing through them so as to avoid any excess friction. Blades are longer than the base width so the dotted line will look to be a greater curve (when viewed from the end) than the actual curve will be. Each blade rises to opposite side of ring at point opposite to outer contact point of next 7 inch base blade in clockwise direction. All turbine rings must be put in turbine so the end of ring showing the 7 inch base of blades is toward the center of tub No. 5. The pipe at end of stack pipes No 32 that goes up and is curved so as to go into housing holding turbine bearing must be splined on inside 9 inches so a ring of same size as turbine ring can be pressed into it. The purpose of this ring is that the blades in it will cause a clockwise force on the ring. This is because base of blades will be toward center of tub No. 5, but instead of the blades angling up to a point on opposite side of ring as in turbine rings, these blades must angle down at the same angle. This stationary ring in end of pipe No. 32 will therefore cause the water coming from tub center tank through stack pipes to have a counter clockwise force on water as it comes out of this ring and strikes the base of the first ring in the turbine. As the rings in the turbine cause a counter clockwise force on turbine this will help increase the power developed by the blades in the turbine. Two inch wide threaded ring on same pattern as 2 inch turbine ring is to be used to hold stationary pipe ring in pipe No. 32 at end next turbine as a key to hold ring.

No. 42 shows that the rings to act as keys in turbine and in end of pipe No 32 must have threads deeper than the spline griives so as not to interfer in the sliding of the rings into place. These rings must be thicker so that the inside of these rings will be the same size as the inside of the turbine rings No. 38A.

Turbine No. 30 must be strong for it will be the axle for a 24 inch wheel that must be as heavy and durable as the cast wheels on a railroad car as they must operate constantly on a circular track that should be of at least a 100 and 10 pounds per foot in weight equal to the kind used by the railroads. This power unit is to be built for constant operation over a long period of time. The siphon lids on inside of tub No. 5 must have straight edge on side to right as you look down on them. They must also have a curved up side on them outside of siphon so water will flow in a more direct manner onto vanes on sloping wall of water tank in tub No. 5.

The lubricating system for the bearings on the turbines will consist of twenty stainless steel, with highly polished and smooth inside bore finish, tubes that will hold lubricant. No drawing is made of these as the end next to the water tank in tub No. 5 will be one half way between a pair of turbines. Lubricating lines will run from other end to the bearings on the left and right side of turbine on each side of it. A fitting so they can be refilled will also be on this end. In end next to water tank a piston will be set so it can move freely by the force of centrifugal force against the lubricant inside tube. No drawing is made of this system for the amount of lubricant needed by the bearings and time decided on as to when the tube should be refilled by the manufacturer of the bearings will be needed to obtain specific specifications for this type of lubrication system. I claim to be the inventor only of this type system regardless of its size or capacity as these will vary from unit to unit due to constant improvements in lubricants so more or less of same is needed to sustain parts for a longer period of time in operating condition.

Siphon lids and siphon ends next to openings should be of stainless steel even as tube and piston in lubricating system should be of stainless steel so metal will not rust from constant approximenity to water and water vapor.

All valves should be of copper for the same reason, including fittings and tubes from lubricating system to bearings. Steel cable that operates inside siphon lids should also be of stainless steel. Stainsteel piston must be used in lubricating tube so it will not corrode to walls but will be of sufficient weight as to give the required pressure to lubricant so proper amount will be deivered by copper tubing to the bearings on the turbines by the centrifugal force that will be acting on it as tub No. 5 turns. Lubrication of bearings of shaft No. 7 can be done at any time as housing for them is stationary but fillings of copper or brass is recommended so as to not have rust on them for they are also in a room where water vapor from the evaporation of water is greater than normal due to the constant flow of water from the siphons and the constant discharge of water by the nozzle on the turbines.

By having 10 stack pipes each one will have a mass of 50 times the gravity weight of water of the one foot of vertical it will have to overcome. The vertical lift on each stack set of 10 pipes is about 10 ft. Each stack pipe therefore will have only 1 foot of this height to overcome by centrifugal force. The ten stack horizontal pipes will each have 1/10 of the vertical force to overcome in order to cause the flow of water up to and out through the turbine and turbine nozzle. This is the reason for the stack pipes. This principle reduces the reaction force to a force that becomes less after the flow does go through the turbine nozzle as here the centrifugal force helps pull the water up from the stack pipes. To reduce the resistance of the 10 foot lift to turbine per stack pipe more pipes can be added if needed to create greater power.

What I claim as my invention is:

1. A recycle power unit, comprising a base, a rotating tub mounted on the base, a circular track mounted on the base in a position concentric to the tub, a circular track mounted on the base in a position concentric to the tub, a plurality of stack pipes radially extending from the tub, each of said stack pipes having the outer end thereof supported by one of said turbine wheels, each of said turbines having turbine blades positioned to be engaged by a fluid exiting from its associated stack pipe to thereby rotate the turbine wheel and cause the tub to rotate, a plurality of discharge pipes each connected to one of the turbines so it can receive fluid from said turbine and having a curvature such that fluid exiting from the discharge pipe creates a reaction force in the direction of tub rotation, means outside the circular wall for collecting fluid exiting from the discharge pipes, and means for siphoning the fluid from the means back into the tub.

* * * * *